(12) United States Patent
Ghosh et al.

(10) Patent No.: US 12,596,936 B2
(45) Date of Patent: Apr. 7, 2026

(54) PREDICTIVE DATA ANALYSIS TECHNIQUES USING GRAPH-BASED CODE RECOMMENDATION MACHINE LEARNING MODELS

(71) Applicant: Optum Technology, Inc., Eden Prairie, MN (US)

(72) Inventors: Nilav Baran Ghosh, Hyderabad (IN); Abhilash Sivva, Hyderabad (IN); Srikanth B. Adibhatla, Hyderabad (IN)

(73) Assignee: Optum Technology, Inc., Eden Prairie, MN (US)

( * ) Notice: Subject to any disclaimer, the term of this patent is extended or adjusted under 35 U.S.C. 154(b) by 1296 days.

(21) Appl. No.: 17/205,704

(22) Filed: Mar. 18, 2021

(65) Prior Publication Data

US 2022/0300835 A1      Sep. 22, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .. G06N 5/04; G06N 20/00; G06F 8/10; G06F 8/20; G06F 8/35
See application file for complete search history.

(56) References Cited

U.S. PATENT DOCUMENTS

| | | | |
|---|---|---|---|
| 8,606,743 | B2 | 12/2013 | Li et al. |
| 9,002,776 | B2 | 4/2015 | Stupp et al. |
| 10,252,145 | B2 | 4/2019 | Tran et al. |
| 10,452,961 | B2 | 10/2019 | Hu et al. |
| 10,565,509 | B2 | 2/2020 | London |
| 2015/0025908 | A1 | 1/2015 | Lakshminarayan et al. |
| 2015/0332158 | A1* | 11/2015 | He ...................... G06F 16/9024 706/52 |
| 2017/0046602 | A1 | 2/2017 | Hu et al. |
| 2017/0161279 | A1* | 6/2017 | Franceschini .......... G06N 5/022 |

(Continued)

OTHER PUBLICATIONS

Krstajic et al., "CloudLines: Compact Display of Event Episodes in Multiple Time-Series" (Year: 2011).*

(Continued)

*Primary Examiner* — Brian M Smith
(74) *Attorney, Agent, or Firm* — Alston & Bird LLP

(57) ABSTRACT

Solutions for more efficient and effective predictive code recommendation are disclosed. In one example, a method includes identifying a graph-based code recommendation machine learning model, wherein each inferred edge weight value of the graph-based code recommendation machine learning model is updated based at least in part on each compressed forward-adjusted temporal distance measure for an observed co-occurrence of any observed co-occurrences of a predictive code pair for the inferred edge weight value within one or more temporally-proximate occurrence subsets determined based at least in part on a plurality of training predictive code occurrences; processing the input predictive code using the graph-based code recommendation machine learning model to generate one or more related codes of the plurality of predictive codes for the input predictive code; and performing one or more prediction-based actions based at least in part on the one or more related codes.

20 Claims, 11 Drawing Sheets

401

Identify training predictive code occurrences
501

Generate temporally-proximate occurrence subsets
502

Determine observed co-occurrences
503

Update the graph-based code recommendation machine learning model based on each pairwise temporal distance measure for an observed co-occurrence
504

(56) References Cited

U.S. PATENT DOCUMENTS

| | | | |
|---|---|---|---|
| 2019/0354883 A1 | 11/2019 | Aravamudan et al. | |
| 2019/0371475 A1* | 12/2019 | Oliveira | G06N 5/01 |
| 2020/0159748 A1 | 5/2020 | Shah et al. | |
| 2020/0160063 A1 | 5/2020 | Alvi et al. | |
| 2020/0193151 A1 | 6/2020 | Wnuk et al. | |

OTHER PUBLICATIONS

Li et al., "Marrying Medical Domain Knowledge With Deep Learning on Electronic Health Records: A Deep Visual Analytics Approach" (Year: 2020).*

Moskovitch et al., "Prognosis of Clinical Outcomes with Temporal Patterns and Experiences with One Class Feature Selection" (Year: 2017).*

Su et al., "GATE: Graph-Attention Augmented Temporal Neural Network for Medication Recommendation" (Year: 2020).*

Kwak, H. et al., "Drug-disease graph: predicting adverse drug reaction signals via graph neural network with clinical data," Pacific Asia Conf. on Knowledge Discovery and Data Mining (PAKDD 2020) pp. 633-644. (Year: 2020).*

Hettige, B. et al., "MedGraph: structural and temporal representation learning of electronic medical records," downloaded from <arxiv.org/abs/1912.03703> (Jul. 23, 2020) 8 pp. (Year: 2020).*

Zhang, S. et al., "MTPGrpah: a data-driven approach to predict medical risk based on temporal profile graph," 2016 IEEE TrustCom-BigDataSE-ISPA (Aug. 2016) 8 pp. (Year: 2016).*

Su, Chenhao et al. "GATE: Graph-Attention Augmented Temporal Neural Network For Medication Recommendation," IEEE Access, vol. 8, Jul. 7, 2020, pp. 125447-125458, DOI: 10.1109/ACCESS.2020.3007835.

Shen, et al., "On Efficient Training of Large-Scale Deep Learning Models: A Literature Review", arXiv:2304.03589v1, Apr. 7, 2023, (37 pages).

* cited by examiner

External Computing Entities 102

Predictive Data Analysis Computing Entity 106

Storage Subsystem 108

Predictive Data Analysis System 101

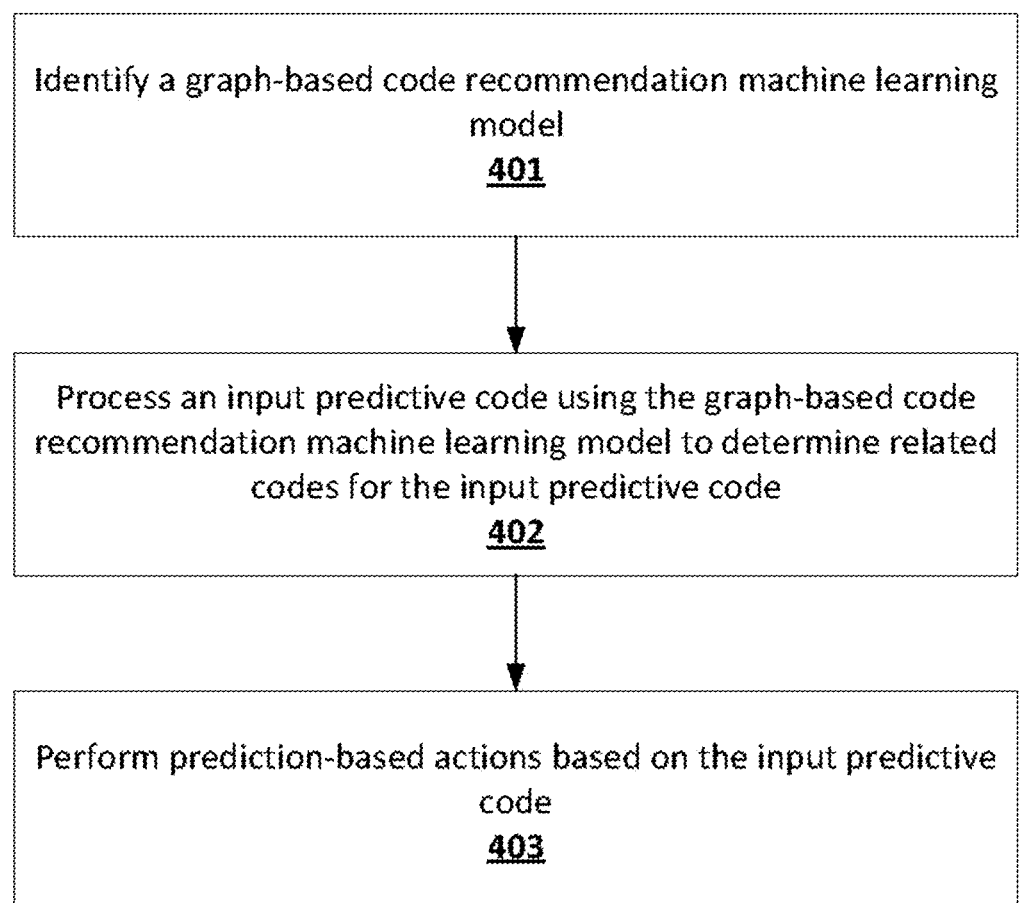
FIG. 4

401

Identify training predictive code occurrences
501

Generate temporally-proximate occurrence subsets
502

Determine observed co-occurrences
503

Update the graph-based code recommendation machine learning model based on each pairwise temporal distance measure for an observed co-occurrence
504

Figure 6:
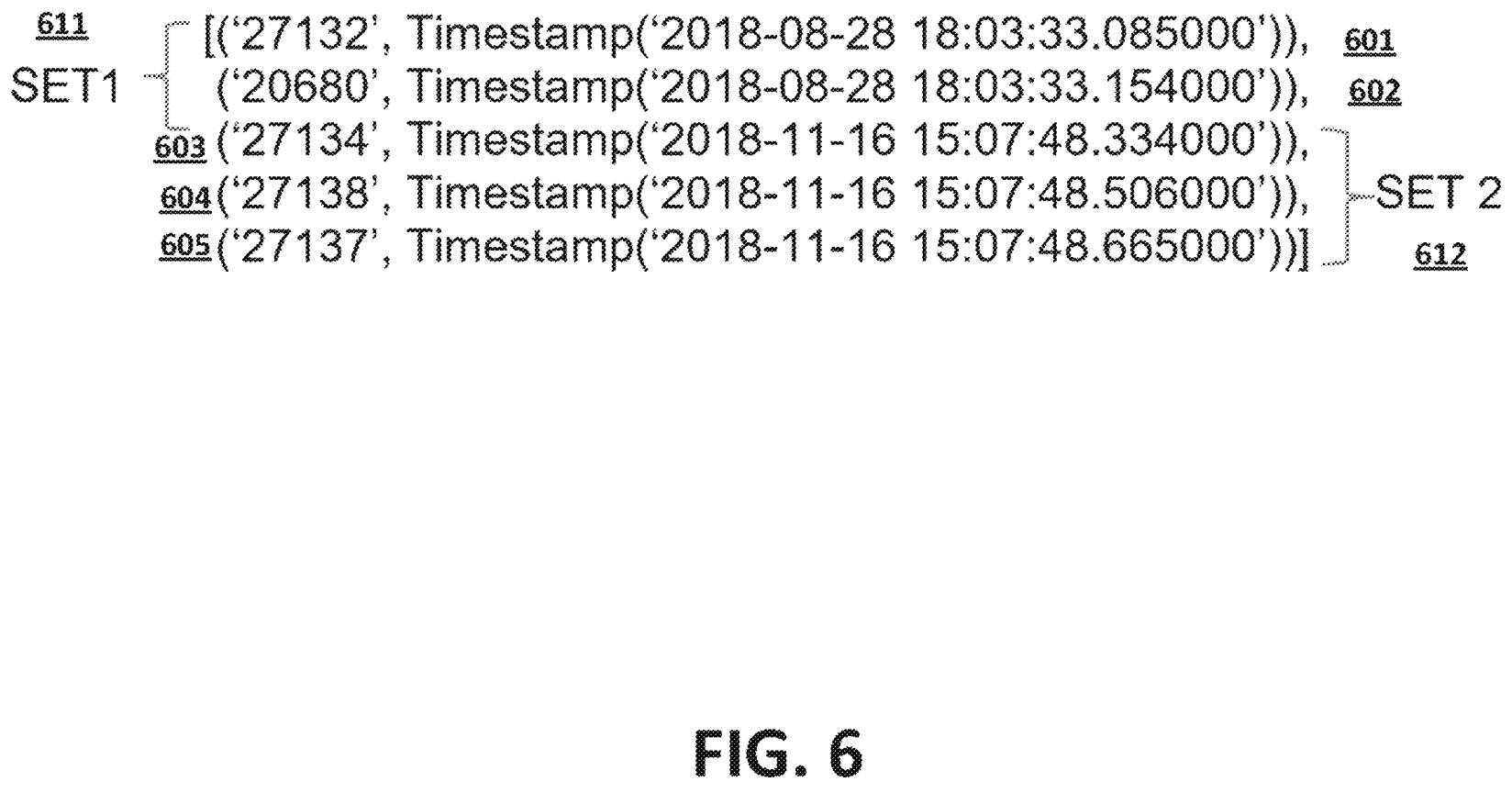

611
SET1

[('27132', Timestamp('2018-08-28 18:03:33.085000')),    601

('20680', Timestamp('2018-08-28 18:03:33.154000')),    602

603 ('27134', Timestamp('2018-11-16 15:07:48.334000')), 604 ('27138', Timestamp('2018-11-16 15:07:48.506000')), 605 ('27137', Timestamp('2018-11-16 15:07:48.665000'))]    SET 2

502
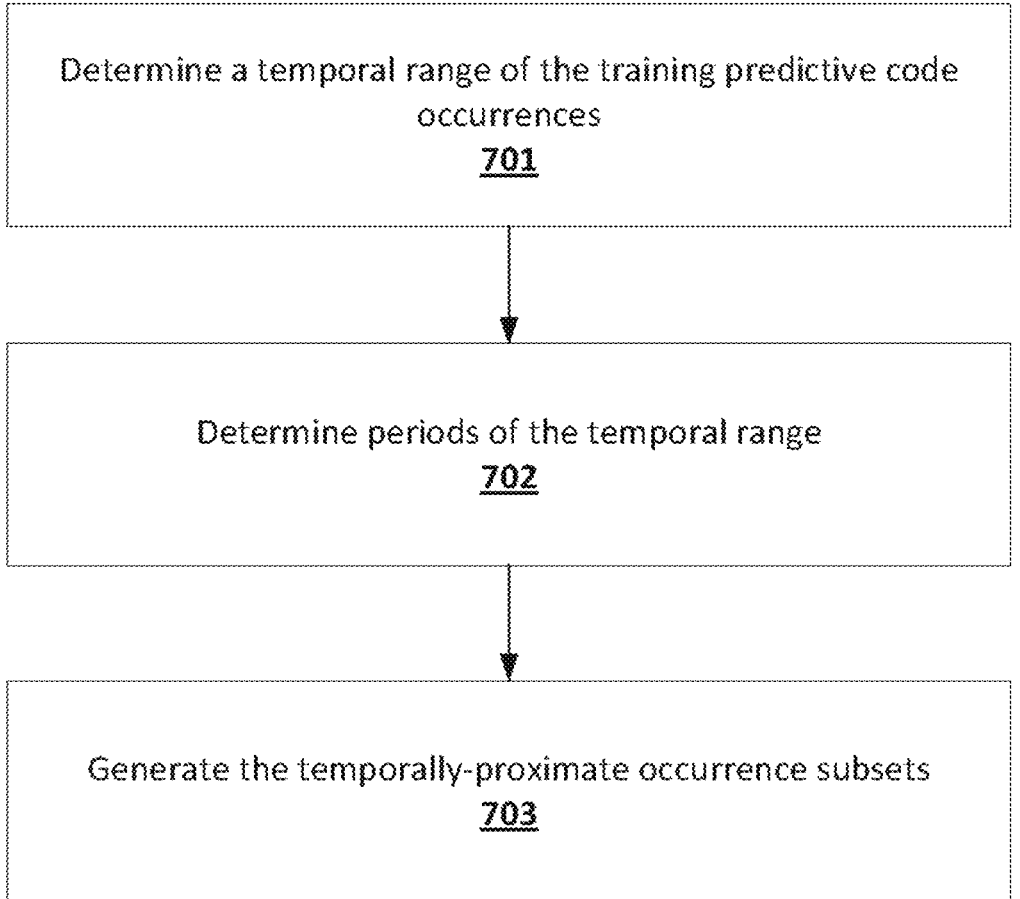
Determine a temporal range of the training predictive code occurrences
701
Determine periods of the temporal range
702
Generate the temporally-proximate occurrence subsets
703
FIG. 7

Perform a forward adjustment transformation on the pairwise temporal distance measure for the observed co-occurrence to generate a forward-adjusted temporal distance measure for the observed co-occurrence
801

Perform a compression transformation on the forward-adjusted temporal distance measure for the observed co-occurrence to generate a compressed forward-adjusted temporal distance measure for the observed co-occurrence
802

Update the inferred edge weight value based on the compressed forward-adjusted temporal distance measure
803

FIG. 8

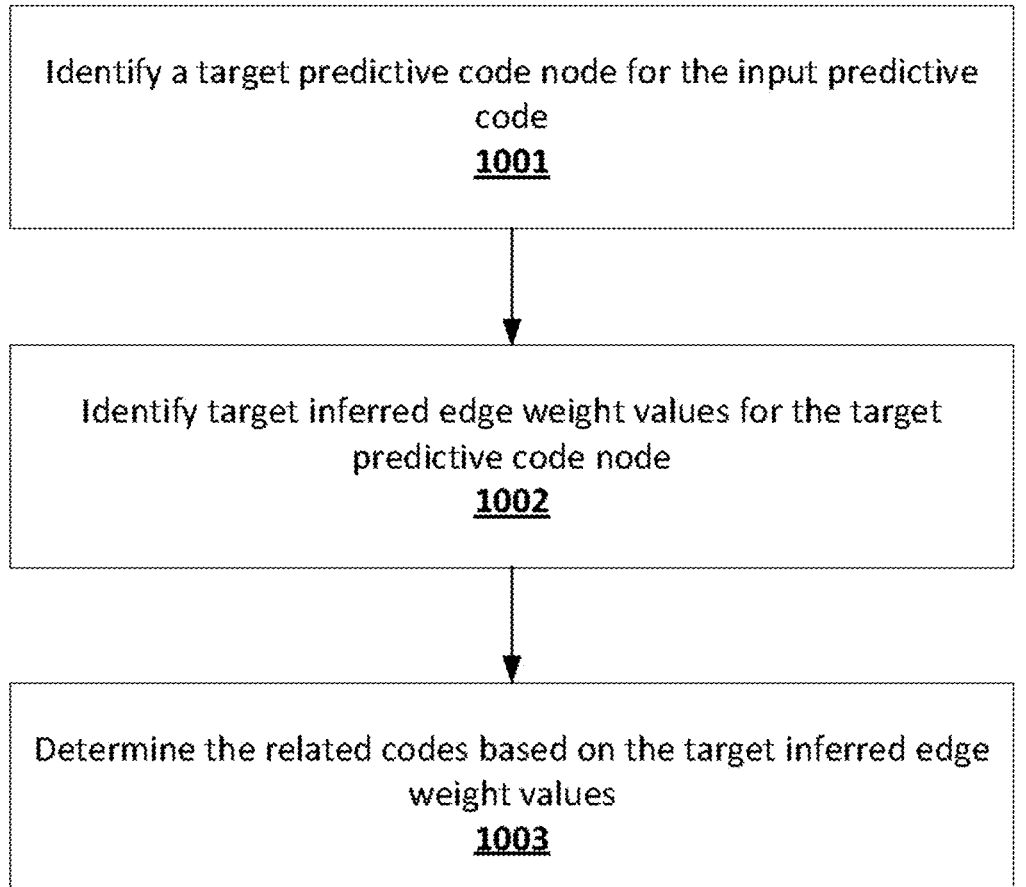
FIG. 10

PREDICTIVE DATA ANALYSIS TECHNIQUES USING GRAPH-BASED CODE RECOMMENDATION MACHINE LEARNING MODELS

BACKGROUND

Various embodiments of the present invention address technical challenges related to performing efficient and effective code recommendation.

BRIEF SUMMARY

In general, embodiments of the present invention provide methods, apparatuses, systems, computing devices, computing entities, and/or the like for performing efficient and effective code recommendation using graph-based code recommendation machine learning models.

In accordance with one aspect, a method includes: identifying a graph-based code recommendation machine learning model, wherein: the graph-based code recommendation machine learning model is characterized by a plurality of predictive code nodes and a plurality of inferred edge weight values between the plurality of predictive code nodes, each predictive code node of the plurality of predictive code nodes is associated with a predictive code of a plurality of predictive codes, each inferred edge weight value of the plurality of inferred edge weight values is associated with a predictive code pair from the plurality of predictive codes, and each inferred edge weight value of the plurality of inferred edge weight values is updated based at least in part on each compressed forward-adjusted temporal distance measure for an observed co-occurrence of any observed co-occurrences of the predictive code pair for the inferred edge weight value within one or more temporally-proximate occurrence subsets determined based at least in part on a plurality of training predictive code occurrences; processing the input predictive code using the graph-based code recommendation machine learning model to generate one or more related codes of the plurality of predictive codes for the input predictive code, wherein the one or more related codes are selected based at least in part on each inferred edge weight value of the plurality of inferred edge weight values for the predictive code node of the plurality of predictive code nodes that is associated with the input predictive code; and performing one or more prediction-based actions based at least in part on the one or more related codes.

In accordance with another aspect, an apparatus comprising at least one processor and at least one memory including program code, the at least one memory and the program code configured to, with the processor, cause the apparatus to at least: identify a graph-based code recommendation machine learning model, wherein: the graph-based code recommendation machine learning model is characterized by a plurality of predictive code nodes and a plurality of inferred edge weight values between the plurality of predictive code nodes, each predictive code node of the plurality of predictive code nodes is associated with a predictive code of a plurality of predictive codes, each inferred edge weight value of the plurality of inferred edge weight values is associated with a predictive code pair from the plurality of predictive codes, and each inferred edge weight value of the plurality of inferred edge weight values is updated based at least in part on each compressed forward-adjusted temporal distance measure for an observed co-occurrence of any observed co-occurrences of the predictive code pair for the inferred edge weight value within one or more temporally-proximate occurrence subsets determined based at least in part on a plurality of training predictive code occurrences; process the input predictive code using the graph-based code recommendation machine learning model to generate one or more related codes of the plurality of predictive codes for the input predictive code, wherein the one or more related codes are selected based at least in part on each inferred edge weight value of the plurality of inferred edge weight values for the predictive code node of the plurality of predictive code nodes that is associated with the input predictive code; and perform one or more prediction-based actions based at least in part on the one or more related codes.

In accordance with yet another aspect, a computer program product computer program comprising at least one non-transitory computer-readable storage medium having computer-readable program code portions stored therein, the computer-readable program code portions configured to: identify a graph-based code recommendation machine learning model, wherein: the graph-based code recommendation machine learning model is characterized by a plurality of predictive code nodes and a plurality of inferred edge weight values between the plurality of predictive code nodes, each predictive code node of the plurality of predictive code nodes is associated with a predictive code of a plurality of predictive codes, each inferred edge weight value of the plurality of inferred edge weight values is associated with a predictive code pair from the plurality of predictive codes, and each inferred edge weight value of the plurality of inferred edge weight values is updated based at least in part on each compressed forward-adjusted temporal distance measure for an observed co-occurrence of any observed co-occurrences of the predictive code pair for the inferred edge weight value within one or more temporally-proximate occurrence subsets determined based at least in part on a plurality of training predictive code occurrences; process the input predictive code using the graph-based code recommendation machine learning model to generate one or more related codes of the plurality of predictive codes for the input predictive code, wherein the one or more related codes are selected based at least in part on each inferred edge weight value of the plurality of inferred edge weight values for the predictive code node of the plurality of predictive code nodes that is associated with the input predictive code; and perform one or more prediction-based actions based at least in part on the one or more related codes.

BRIEF DESCRIPTION OF THE DRAWINGS

Figure 1:
Figure 2:
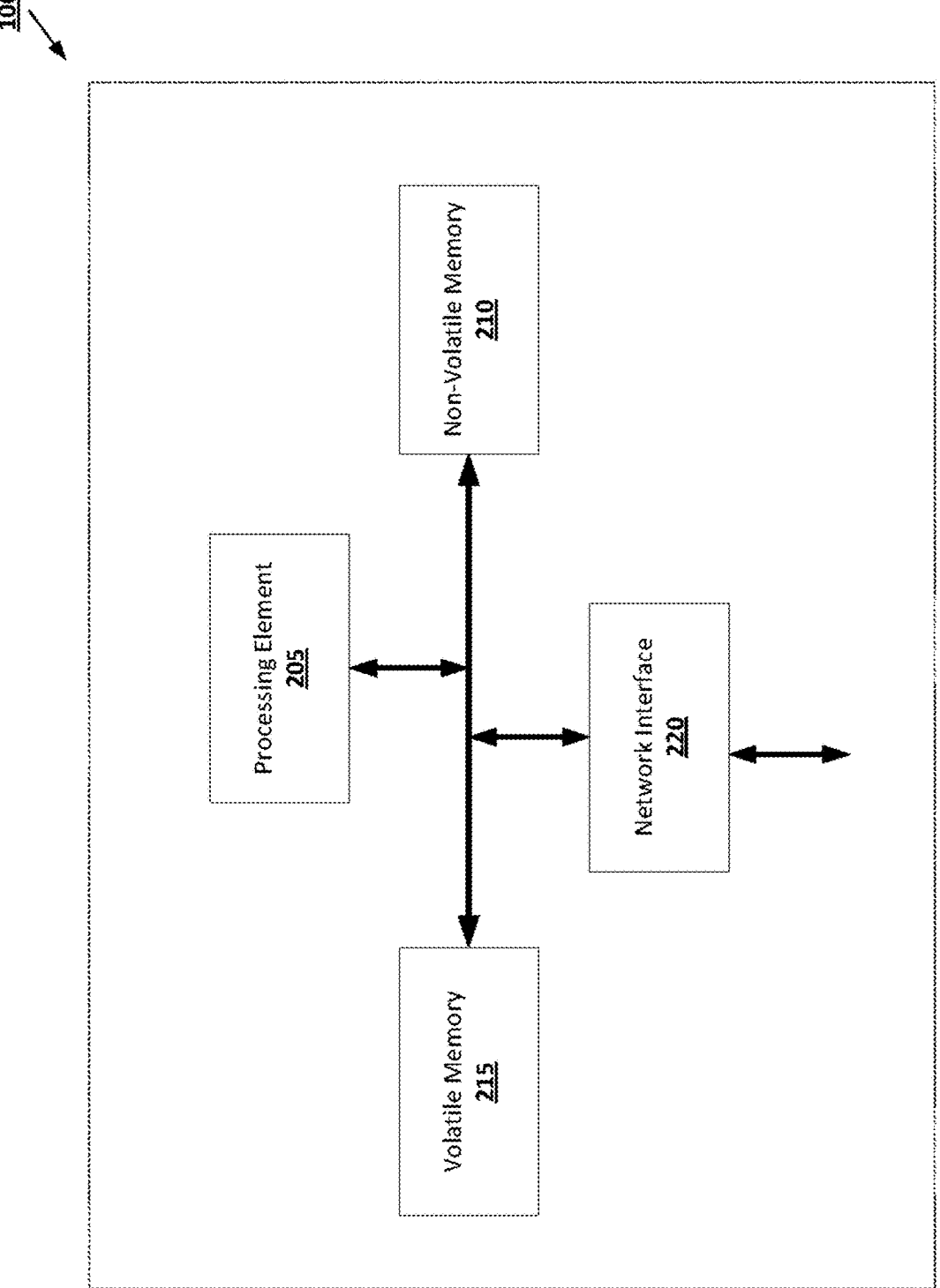
Figure 3:
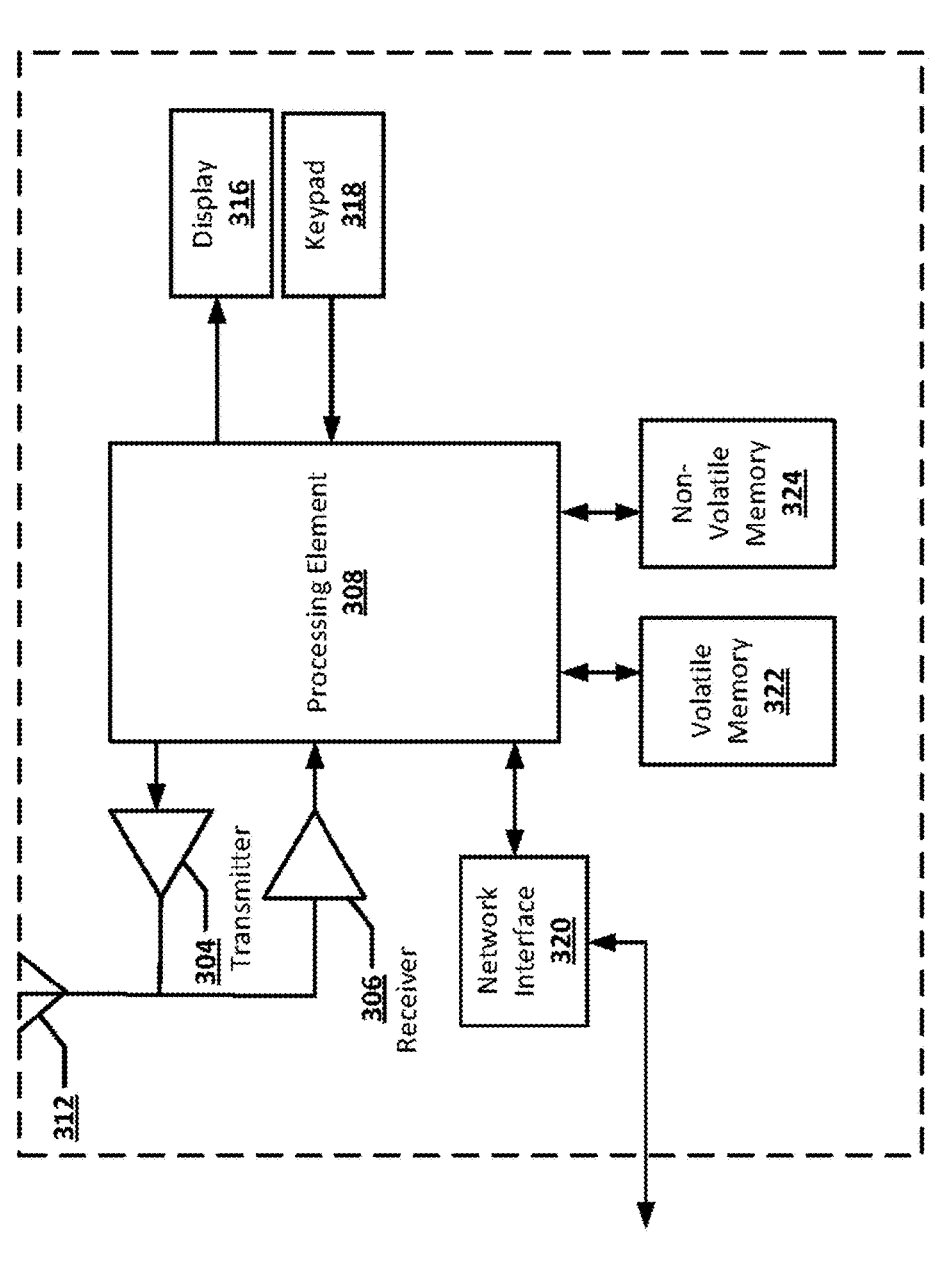
Figure 5:
Figure 9:
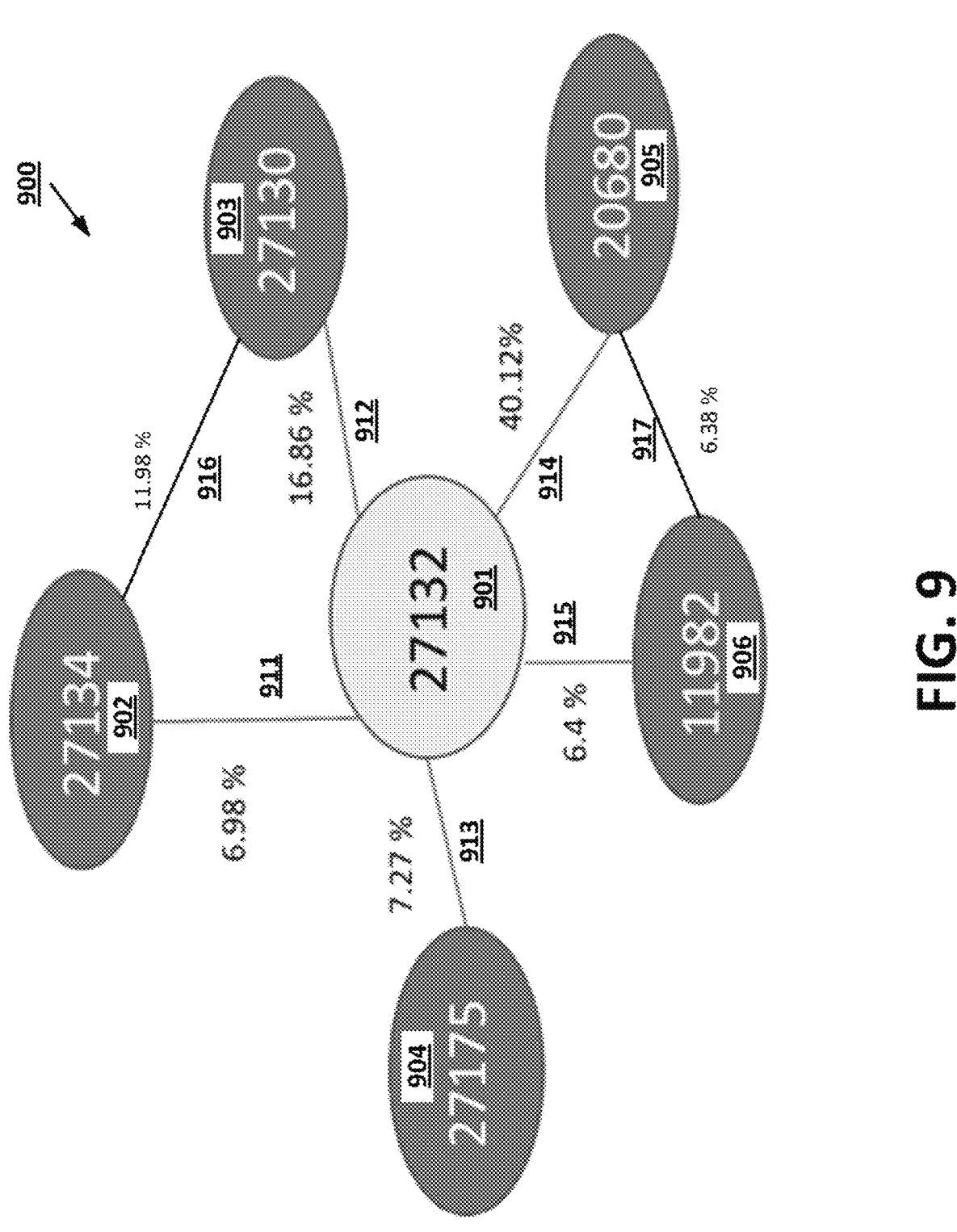
Figure 11:
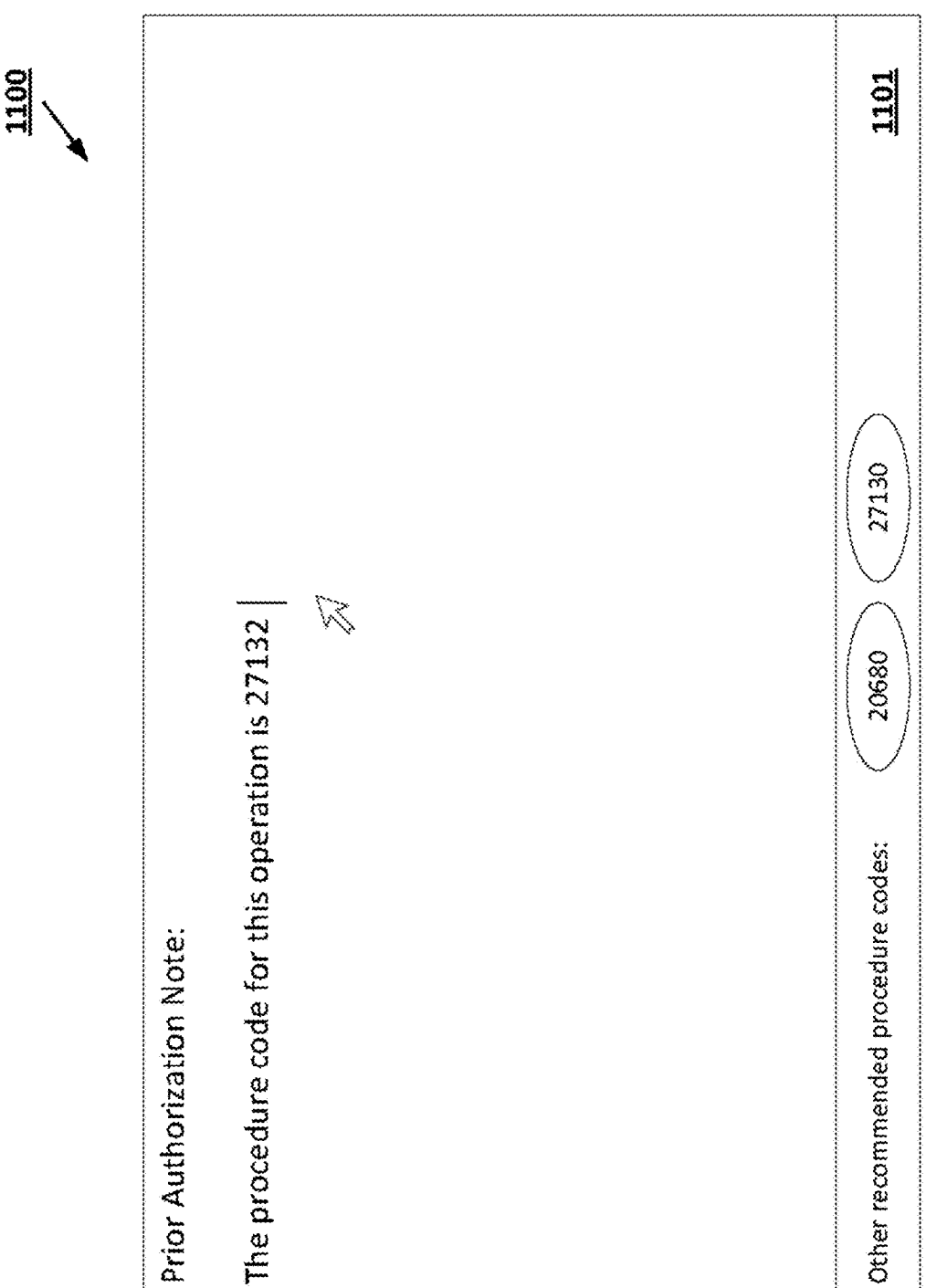

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 is a flowchart diagram of an example process for performing predictive code recommendation in accordance with some embodiments discussed herein;

FIG. 5 is a flowchart diagram of an example process for performing a training iteration for a graph-based code recommendation machine learning model in accordance with some embodiments discussed herein;

FIG. 6 provides an operational example of generating temporally-proximate occurrence subsets based at least in part on a group of training predictive code occurrences in accordance with some embodiments discussed herein;

FIG. 7 is a flowchart diagram of an example process for generating one or more temporally-proximate occurrence subsets based at least in part on a group of training predictive code occurrences in accordance with some embodiments discussed herein;

FIG. 8 is a flowchart diagram of an example process for updating an inferred edge weight value based at least in part on a corresponding observed co-occurrence in accordance with some embodiments discussed herein;

FIG. 9 provides an operational example of a graph-based code recommendation machine learning model in accordance with some embodiments discussed herein;

FIG. 10 is a flowchart diagram of an example process for processing an input predictive code using a graph-based code recommendation machine learning model in accordance with some embodiments discussed herein; and FIG. 11 provides an operational example of a prediction output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Overview and Technical Advantages

Various embodiments of the present invention address technical problems associated with computational efficiency of predictive data analysis frameworks by introducing solutions that utilize a graph-based code recommendation machine learning model to generate output predictive codes that are predicted to be related to an input predictive code. By using a graph-based code recommendation machine learning model whose inferred edge weight values are determined during training, various embodiments of the present invention enable utilizing machine learning solutions in performing predictive code recommendation while maintaining a linear computational complexity for using a trained graph-based code recommendation machine learning model to perform predictive code recommendation inferences. This is because, given an input predictive code, predictive code recommendation inference with respect to the input predictive code can be performed by detecting a predictive code node for the input predictive code within the graph-based code recommendation machine learning model and processing the inferred edge weight values associated with the predictive code node, a combination of operations that can be done with linear time complexity for each input predictive code.

Accordingly, by utilizing a graph-based code recommendation machine learning model to generate output predictive codes that are predicted to be related to an input predictive code, various embodiments of the present invention increase the computational efficiency of performing predictive code recommendation by reducing the number of processing cycles that need to be performed to perform predictive code recommendation with respect to a particular input predictive code. In some embodiments, the time complexity of performing predictive code recommendation for a group of input predictive codes can be further reduced by utilizing a number of parallel processors and/or a number of distributed processors to perform graph traversal operations for each input predictive input code of the group of input predictive codes in a parallel/distributed manner. This is because each set of graph traversal operations performed herein to generate output predictive codes that are predicted to be related to a corresponding input predictive code can be performed independent of other sets of graph traversal operations for other corresponding input predictive codes, without inter-process dependencies/deadlocks that often complicate parallel/distributed processing.

Moreover, various embodiments of the present invention address the problems associated with scalability of performing predictive code recommendation by utilizing a graph-based code recommendation machine learning model that can be augmented to add inferred edge weight values corresponding to a new predictive code node for a new predictive code without disturbing/affecting the inferred edge weight values of existing predictive code nodes for existing predictive codes. This scalability advantage of the graph-based code recommendation machine learning models described by various embodiments of the present invention is particularly advantageous in fast-changing domains such as the medical domain where new procedures associated with new procedure codes are added on a frequent basis. By utilizing a graph-based code recommendation machine learning model that can be augmented to add inferred edge weight values corresponding to a new predictive code node for a new predictive code without disturbing/affecting the inferred edge weight values of existing predictive code nodes for existing predictive codes, various embodiments of the present invention address the problems associated with scalability of performing predictive code recommendation and make further technical contributions to improving predictive data analysis techniques.

Definitions of Certain Terms

The term "predictive code" may refer to an electronically-stored data construct that is configured to describe a value defined by a coding scheme that is used to encode event occurrences across a system, where the predictive codes defined by the coding scheme are among the predictive entities used by predictive data analysis operations defined by various embodiments of the present invention. For example, a predictive code may be a medical procedure code defined by a medical procedure coding scheme (e.g., the International Classification of Diseases (ICD) coding scheme) that is used to encode procedure records across one or more medical institutions. In some embodiments, a predictive data analysis system may be configured to detect that a particular provider user profile has inputted a provider code (e.g., in relation to a prior-authorization-related operation) and in response perform at least one of the following operations: (i) predict a predefined number of related procedure code for the input procedure code using the graph-based code recommendation machine learning model and recommend the predefined number of related procedure codes to the provider user profile, or (ii) predict a predefined number of related procedure code for the input procedure code using the graph-based code recommendation machine learning model and present a sorted list of the predefined number of related procedure codes to the provider user profile. The predictive code may be an atomic value, a one-dimensional array, or a two-dimensional array.

The term "predictive code occurrence" may refer to an electronically-stored data construct that is configured to describe an occurrence of an event characterized by a corresponding predictive code at an occurrence timestamp. For example, a predictive code occurrence may describe that a medical procedure associated with a corresponding medical procedure code has occurred on Nov. 23, 2020. As another example, a predictive code occurrence may describe that a medical procedure associated with a corresponding medical procedure code has occurred on Nov. 23, 2020 at 9:39:21 PM. In some embodiments, when a predictive code occurrence is among a group of predictive code occurrences (e.g., a group of historical predictive code occurrences) that is used to update inferred edge weight values of a graph-based code recommendation machine learning model, the predictive code occurrence is referred to as a training predictive code occurrence. In some embodiments, when a predictive code occurrence is processed using a trained graph-based code recommendation machine learning model to predict related predictive codes for a predictive code of the predictive code occurrence, the predictive code occurrence is referred as an input predictive code occurrence. The predictive code occurrence may be a one-dimensional array or a two-dimensional array.

The term "temporally-proximate occurrence subset" may refer to an electronically-stored data construct that is configured to describe a subgroup of training predictive code occurrences whose occurrence timestamps are within a common period in a manner that leads to an inference that the predictive code occurrences in the subgroup may be temporally related. For example, a temporally-proximate occurrence subset may describe a group of medical procedure occurrence records that have occurred within a common period. In some embodiments, a predictive data analysis computing entity may generate one or more temporally-proximate occurrence subsets in a manner such that no two predictive code occurrences fall within a common temporally-proximate occurrence subset if their respective occurrence timestamps is more than n days of each other, where n may for example be thirty days. In some embodiments, generating one or more temporally-proximate occurrence subsets comprises identifying a temporal range for a group of predictive code occurrences that comprises each occurrence timestamp for a predictive code occurrence of the group of predictive occurrences; determining, based at least in part on a temporal subdivision hyper-parameter of the graph-based code recommendation machine learning model, a plurality of periods of the temporal range; and for each period of the plurality of periods: (i) determining whether the period is associated with at least one predictive occurrence of the group of predictive code occurrences, where a predictive code occurrence is deemed to be associated with a period of the plurality of periods if the occurrence timestamp for the predictive co-occurrence falls within the period, and (ii) in response to determining that the period is associated with the at least one predictive occurrence of the group of predictive code occurrences, determining a temporally-proximate occurrence subset of the one or more temporally-proximate occurrence subsets to comprise the at least one predictive occurrence. A temporally-proximate occurrence subset may be a linked list of predictive code occurrences, where each predictive code occurrence may in some embodiments be a one-dimensional array or a two-dimensional array.

The term "temporal range" may refer to an electronically-stored data construct that is configured to describe a time period that includes each occurrence timestamp associated with a training predictive code occurrence in a group of training predictive code occurrences that are associated with the temporal range. The temporal range may be subdivided into periods in order to generate temporally-proximate occurrence subsets for the group of training predictive code occurrences. In some embodiments, the temporal range for a particular group of training predictive code occurrences may begin with the earliest occurrence timestamp for the group of predictive code occurrences and terminate with the latest occurrence timestamp for the group of predictive code occurrences.

The term "temporal subdivision hyper-parameter" may refer to an electronically-stored data construct that is configured to describe a maximum allowed pairwise temporal distance measure (e.g., a maximum allowed number of days) for any pair of predictive code occurrences that are included in a common temporally-proximate occurrence subset. For example, if a predictive data analysis computing entity generates one or more temporally-proximate occurrence subsets in a manner such that no two predictive code occurrences fall within a common temporally-proximate occurrence subset if their respective occurrence timestamps is more than n days of each other, n may be defined by the temporal subdivision hyper-parameter.

The term "observed co-occurrence" may refer to an electronically-stored data construct that is configured to describe that two predictive codes associated with a corresponding predictive code pair for the observed co-occurrence both occur within a common temporally-proximate occurrence subset. For example, an observed co-occurrence subset may describe that a corresponding pair of medical procedure codes occur in a common temporally-proximate occurrence subset of a group of medical procedure code records. In some embodiments, if a group of training predictive code occurrences are associated with n temporally-proximate occurrence subsets, then a predictive code pair associated with the group of training predictive code occurrences may be associated with as few as zero observed co-occurrences (if none of the temporally-proximate occurrence subsets include both a predictive code occurrence associated with a first predictive code of the predictive code pair and a predictive code occurrence associated with a second predictive code of the predictive code pair), but possibly n observed co-occurrences (e.g., if each temporally-proximate occurrence subset includes only one predictive code occurrence associated with a first predictive code of the predictive code pair and only one predictive code occurrence associated with a second predictive code), or even more than n observed code occurrences (e.g., if each temporally-proximate occurrence subset includes at least one predictive code occurrence associated with a first predictive code of the predictive code pair and at least one predictive code occurrence associated with a second predictive code, and also at least one temporally-proximate occurrence subset includes more than one predictive code occurrence associated with the first predictive code of the predictive code pair).

The term "pairwise temporal distance measure" may refer to an electronically-stored data construct that is configured to describe a measure of magnitude of the difference between occurrence timestamp of a first predictive code occurrence that is associated with the pairwise temporal distance measure and the occurrence timestamp of a second predictive code occurrence that is associated with the pairwise temporal distance measure. For example, the pairwise temporal distance measure may describe a number of days between the occurrence date of a first predictive code occurrence that is associated with the pairwise temporal distance measure and the occurrence date of a second predictive code occurrence that is associated with the pairwise temporal distance measure. In some embodiments, the pairwise temporal distance measure describes a measure of magnitude of the difference between occurrence timestamp of a first predictive code occurrence that is associated with the pairwise temporal distance measure and the occurrence timestamp of a second predictive code occurrence that is associated with the pairwise temporal distance measure, where the first predictive code occurrence and the second predictive code occurrence are associated with a particular observed co-occurrence, and thus the pairwise temporal distance measure is deemed to be associated with the particular observed co-occurrence.

The term "forward adjustment transformation" may refer to an electronically-stored data construct that is configured to describe a set of computer-implemented operations that are configured to cause a temporal distance measure to increase by a predefined value. For example, a forward adjustment transformation may cause a pairwise temporal distance measure for an observed co-occurrence to increase by a predefined value, for example by a predefined value of two. In some embodiments, performing a forward adjustment transformation on each pairwise temporal distance measure for a related observed co-occurrence of the one or more related observed co-occurrences comprises increasing the pair-wise temporal distance measure by two. The output of performing a forward adjustment transformation on a pairwise temporal distance measure for an observed co-occurrence is referred to herein as a forward-adjusted temporal distance measure.

The term "compression transformation" may refer to an electronically-stored data construct that is configured to describe a set of computer-implemented operations that are configured to cause a temporal distance measure to reduce the scale of the temporal distance measure. An example of a compression transformation is a transformation that includes a logarithmic transformation. In some embodiments, performing a compression transformation on a forward-adjusted pairwise temporal distance measure for an observed co-occurrence comprises: performing a logarithmic transformation on the forward-adjusted temporal distance measure to generate a logarithmically-transformed forward-adjusted temporal distance measure for the observed co-occurrence; and generating the compressed forward-adjusted temporal distance measure based at least in part on the logarithmically-transformed forward-adjusted temporal distance measure for the observed co-occurrence. In some of the noted embodiments, generating the compressed forward-adjusted temporal distance measure based at least in part on the logarithmically-transformed forward-adjusted temporal distance measure comprises generating the compressed forward-adjusted temporal distance measure based at least in part on an inverse of the logarithmically-transformed forward-adjusted temporal distance measure. The output of performing a compression transformation on a temporal distance measure is referred to herein as a compressed temporal distance measure, and the output of performing a compression transformation on a forward-adjusted temporal distance measure is referred to herein as a compressed forward-adjusted temporal distance measure. The output of performing a logarithmic transformation on a temporal distance measure is referred to herein as a logarithmically-transformed temporal distance measure, and the output of performing a logarithmic transformation on a forward-adjusted temporal distance measure is referred to herein as a logarithmically-transformed forward-adjusted temporal distance measure.

The term "graph-based code recommendation machine learning model" may refer to an electronically-stored data construct that is configured to describe parameters, hyper-parameters, and/or defined operation of a machine learning model that is characterized by a group of predictive code nodes and a group of inferred edge weight values, where each predictive code node of the group of predictive code nodes is associated with a predictive code of a group of predictive nodes, and where each weight value is in turn associated with a predictive code pair of the group of predictive code nodes and describes an inferred degree of relationship between the predictive code pair based at least in part on observed co-occurrences of the predictive code pair within temporally-proximate subsets that are determined based at least in part on training predictive code-occurrences. For example, in some embodiments, an inferred edge weight value in the graph-based code recommendation machine learning model may be determined in the following manner: (i) before any training iterations of the graph-based code recommendation machine learning model is performed, the inferred edge weight value may be set to a predefined initial value (e.g., a predefined initial value of zero), and (ii) during each training iteration of the graph-based code recommendation machine learning model, if the predictive code pair co-occurs within one or more temporally-proximate subsets that are determined based at least in part on training predictive code occurrences for the training iteration, the inferred edge weight value may be determined based at least in part on the one or more predictive code pair co-occurrences (e.g., based at least in part on a temporal distance measure for each predictive code pair co-occurrence of the one or more predictive co-occurrences). In this manner, the inferred edge weight values may be deemed to be parameters of the graph-based code recommendation machine learning that are updated/optimized during training iterations, and can at each time be used to determine related predictive codes for an input predictive codes.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

FIG. 1 is a schematic diagram of an example system architecture 100 for performing predictive data analysis steps/operations and generating corresponding user interface data (e.g., for providing and/or updating a user interface). The system architecture 100 includes a predictive data analysis system 101 comprising a predictive data analysis computing entity 106 configured to generate predictive outputs that lead to performing one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 includes generating one or more related predictive codes for an input predictive code.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 (e.g., management computing entity) may periodically update/provide raw input data (e.g., data objects describing primary events and/or secondary events) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS))). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary System Operations

Various embodiments of the present invention address technical problems associated with computational efficiency of predictive data analysis frameworks by introducing solutions that utilize a graph-based code recommendation machine learning model to generate output predictive codes that are predicted to be related to an input predictive code. By using a graph-based code recommendation machine learning model whose inferred edge weight values are determined during training, various embodiments of the present invention enable utilizing machine learning solutions in performing predictive code recommendation while maintaining a linear computational complexity for using a trained graph-based code recommendation machine learning model to perform predictive code recommendation inferences. This is because, given an input predictive code, predictive code recommendation inference with respect to the input predictive code can be performed by detecting a predictive code node for the input predictive code within the graph-based code recommendation machine learning model and processing the inferred edge weight values associated with the predictive code node, a combination of operations that can be done with linear time complexity for each input predictive code.

FIG. 4 is a flowchart diagram of an example process 400 for performing predictive code recommendation in relation to an input predictive code of a plurality of predictive codes. Via the various steps/operations of the process 400, the predictive data analysis computing entity 106 can utilize a graph-based code recommendation machine learning model to perform predictive code recommendation with linear computational complexity.

The process 400 begins at step/operation 401 when the predictive data analysis computing entity 106 identifies the graph-based code recommendation machine learning model. For example, the predictive data analysis computing entity 106 may generate the graph-based code recommendation machine learning model based at least in part on model definition data that are retrieved from the storage subsystem 108 of the predictive data analysis system 101.

The graph-based code recommendation machine learning model may describe a machine learning model that is characterized by a group of predictive code nodes and a group of inferred edge weight values, where each predictive code node of the group of predictive code nodes is associated with a predictive code of a group of predictive nodes, and where each weight value is in turn associated with a predictive code pair of the group of predictive code nodes and describes an inferred degree of relationship between the predictive code pair based at least in part on observed co-occurrences of the predictive code pair within temporally-proximate subsets that are determined based at least in part on training predictive code-occurrences. For example, in some embodiments, an inferred edge weight value in the graph-based code recommendation machine learning model may be determined in the following manner: (i) before any training iterations of the graph-based code recommendation machine learning model is performed, the inferred edge weight value may be set to a predefined initial value (e.g., a predefined initial value of zero), and (ii) during each training iteration of the graph-based code recommendation machine learning model, if the predictive code pair co-occurs within one or more temporally-proximate subsets that are determined based at least in part on training predictive code occurrences for the training iteration, the inferred edge weight value may be determined based at least in part on the one or more predictive code pair co-occurrences (e.g., based at least in part on a temporal distance measure for each predictive code pair co-occurrence of the one or more predictive co-occurrences). In this manner, the inferred edge weight values may be deemed to be parameters of the graph-based code recommendation machine learning that are updated during training iterations, and can at each time be used to determine related predictive codes for an input predictive codes.

A predictive code may describe a value defined by a coding scheme that is used to encode event occurrences across a system, where the predictive codes defined by the coding scheme are among the predictive entities used by predictive data analysis operations defined by various embodiments of the present invention. For example, a predictive code may be a medical procedure code defined by a medical procedure coding scheme (e.g., the International Classification of Diseases (ICD) coding scheme) that is used to encode procedure records across one or more medical institutions. In some embodiments, the predictive data analysis system 101 may be configured to detect that a provider user profile has inputted a provider code (e.g., in relation to a prior-authorization-related operation) and in response perform at least one of the following operations: (i) predict a predefined number of related procedure code for the input procedure code using the graph-based code recommendation machine learning model and recommend the predefined number of related procedure codes to the provider user profile, or (ii) predict a predefined number of related procedure code for the input procedure code using the graph-based code recommendation machine learning model and present a sorted list of the predefined number of related procedure codes to the provider user profile.

In some embodiments, the graph-based code recommendation machine learning model may be trained/updated using one or more training iterations, where at each training iteration the inferred edge weight values of the graph-based code recommendation machine learning model may be updated based at least in part on a group of training predictive code occurrences for the training iteration. FIG. 5 is a flowchart diagram of an example process for performing a training iteration to train/update a graph-based code recommendation machine learning model. The process depicted in FIG. 5 begins at step/operation 501 when the predictive data analysis computing entity 106 identifies a group of training predictive code occurrences for the training iteration. For example, the group of training predictive code occurrences may describe a group of medical procedure events associated with a particular patient, associated with a particular health insurance payer, associated with a particular line of business, and/or the like.

A predictive code occurrence may describe an occurrence of an event characterized by a corresponding predictive code at an occurrence timestamp. For example, a predictive code occurrence may describe that a medical procedure associated with a corresponding medical procedure code has occurred on Nov. 23, 2020. As another example, a predictive code occurrence may describe that a medical procedure associated with a corresponding medical procedure code has occurred on Nov. 23, 2020 at 9:39:21 PM. In some embodiments, when a predictive code occurrence is among a group of predictive code occurrences (e.g., a group of historical predictive code occurrences) that is used to update inferred edge weight values of a graph-based code recommendation machine learning model, the predictive code occurrence is referred to as a training predictive code occurrence. In some embodiments, when a predictive code occurrence is processed using a trained graph-based code recommendation machine learning model to predict related predictive codes for a predictive code of the predictive code occurrence, the predictive code occurrence is referred as an input predictive code occurrence.

Operational examples of training predictive code occurrences 601-605 are depicted in FIG. 6. As depicted in FIG. 6, each predictive code occurrence describes a predictive code associated with the predictive code occurrence that is a procedure code as well as an occurrence timestamp for the predictive code occurrence that is a procedure occurrence timestamp.

For example, as depicted in FIG. 6, the training predictive code occurrence 601 describes that a medical procedure associated with the medical procedure code 27132 has occurred on Aug. 28, 2018, the predictive code occurrence 602 describes that a medical procedure associated with the medical procedure code 20680 has occurred on Aug. 28, 2018, the training predictive code occurrence 603 describes that a medical procedure associated with the medical procedure code 27134 has occurred on Nov. 16, 2018, the predictive code occurrence 604 describes that a medical procedure associated with the medical procedure code 27138 has occurred on Nov. 16, 2018, and the predictive code occurrence 605 describes that a medical procedure associated with the medical procedure code 27137 has occurred on Nov. 16, 2018.

Returning to FIG. 5, at step/operation 502, the predictive data analysis computing entity 106 generates one or more temporally-proximate occurrence subsets of the group of training predictive code occurrences based at least in part on the occurrence timestamps that are associated with the group of predictive code occurrences. For example, the predictive data analysis computing entity 106 may generate one or more temporally-proximate occurrence subsets in a manner such that no two predictive code occurrences fall within a common temporally-proximate occurrence subset if their respective occurrence timestamps is more than n days of each other, where n may for example be thirty days.

A temporally-proximate occurrence subset may describe a subgroup of training predictive code occurrences whose occurrence timestamps are within a common period in a manner that leads to an inference that the predictive code occurrences in the subgroup may be temporally related. For example, a temporally-proximate occurrence subset may describe a group of medical procedure occurrence records that have occurred within a common period. As described above, the predictive data analysis computing entity 106 may generate one or more temporally-proximate occurrence subsets in a manner such that no two predictive code occurrences fall within a common temporally-proximate occurrence subset if their respective occurrence timestamps is more than n days of each other, where n may for example be thirty days. In some embodiments, generating one or more temporally-proximate occurrence subsets comprises identifying a temporal range for a group of predictive code occurrences that comprises each occurrence timestamp for a predictive code occurrence of the group of predictive occurrences; determining, based at least in part on a temporal subdivision hyper-parameter of the graph-based code recommendation machine learning model, a plurality of periods of the temporal range; and for each period of the plurality of periods: (i) determining whether the period is associated with at least one predictive occurrence of the group of predictive code occurrences, where a predictive code occurrence is associated with a period of the plurality of periods if the occurrence timestamp for the predictive co-occurrence falls within the period, and (ii) in response to determining that the period is associated with the at least one predictive occurrence of the group of predictive code occurrences, determining a temporally-proximate occurrence subset of the one or more temporally-proximate occurrence subsets to comprise the at least one predictive occurrence.

In some embodiments, step/operation 502 may be performed in accordance with the process that is depicted in FIG. 7. The process that is depicted in FIG. 7 begins at step/operation 701 when the predictive data analysis computing entity 106 determines a temporal range of the group of training predictive code occurrences. A temporal range may describe a time period that includes each occurrence timestamp associated with a training predictive code occurrence in a group of training predictive code occurrences that are associated with the temporal range. The temporal range may be subdivided into periods in order to generate temporally-proximate occurrence subsets for the group of training predictive code occurrences. In some embodiments, the temporal range for a particular group of training predictive code occurrences may begin with the earliest occurrence timestamp for the group of predictive code occurrences and terminate with the latest occurrence timestamp for the group of predictive code occurrences. For example, as depicted in FIG. 6, the temporal range for the depicted group of training predictive code occurrences may include the period starting from Aug. 28, 2018 and ending on Nov. 26, 2018.

At step/operation 702, the predictive data analysis computing entity 106 determines a plurality of periods of the temporal range based at least in part on a temporal subdivision hyper-parameter for the graph-based code recommendation machine learning model. The temporal subdivision hyper-parameter may describe a maximum allowed pairwise temporal distance measure (e.g., a maximum allowed number of days) for any pair of predictive code occurrences that are included in a common temporally-proximate occurrence subset. For example, if the predictive data analysis computing entity 106 generates one or more temporally-proximate occurrence subsets in a manner such that no two predictive code occurrences fall within a common temporally-proximate occurrence subset if their respective occurrence timestamps is more than n days of each other, n may be defined by the temporal subdivision hyper-parameter.

For example, in the operational example of FIG. 6, given a temporal range for the depicted group of training predictive code occurrences that includes the period starting from Aug. 28, 2018 and ending on Nov. 26, 2018, and further given a temporal subdivision hyper-parameter of thirty, the defined periods may include: (i) a first period between Aug. 28, 2018 to Sep. 28, 2018, (ii) a second period between Sep. 29, 2018 to Oct. 25, 2018, and (iii) a third period between Oct. 26, 2018 to Nov. 26, 2018. This temporal subdivision ensures that no two training predictive code occurrences fall within a common temporally-proximate occurrence subset if the respective occurrence timestamps for the two training predictive code occurrences is more than thirty days.

At step/operation 703, the predictive data analysis computing entity 106 generates the temporally-proximate occurrence subsets based at least in part on each period that is associated with at least one training predictive code occurrence, where a training predictive code occurrence is deemed associated with the period if the occurrence timestamp for the predictive code occurrence is within the particular period. For example, in the operational example of FIG. 6, because both the first and the third periods described above are associated with at least one training predictive code occurrence (more particularly, the first period is associated with two training predictive code occurrences 601-602 and the second period is associated with three training predictive code occurrences 603-605), the predictive data analysis computing entity 106 generates: (i) a first temporally-proximate occurrence subset 611 that is associated with the first period described above and includes the training predictive code occurrences 601-602, and (ii) a second temporally-proximate occurrence subset 612 that is associated with the second period described above and includes the training predictive code occurrences 603-605.

Returning to FIG. 5, at step/operation 503, the predictive data analysis computing entity 106 determines a group of observed co-occurrences, where each observed co-occurrence is associated with a predictive code pair and a pairwise temporal distance measure.

An observed co-occurrence may describe that two predictive codes associated with a corresponding predictive code pair for the observed co-occurrence both occur within a common temporally-proximate occurrence subset. For example, an observed co-occurrence subset may describe that a corresponding pair of medical procedure codes occur in a common temporally-proximate occurrence subset of a group of medical procedure code records. In some embodiments, if a group of training predictive code occurrences are associated with n temporally-proximate occurrence subsets, then a predictive code pair associated with the group of training predictive code occurrences may be associated with as few as zero observed co-occurrences (if none of the temporally-proximate occurrence subsets include both a predictive code occurrence associated with a first predictive code of the predictive code pair and a predictive code occurrence associated with a second predictive code of the predictive code pair), but possibly n observed co-occurrences (e.g., if each temporally-proximate occurrence subset includes only one predictive code occurrence associated with a first predictive code of the predictive code pair and only one predictive code occurrence associated with a second predictive code), or even more than n observed code occurrences (e.g., if each temporally-proximate occurrence subset includes at least one predictive code occurrence associated with a first predictive code of the predictive code pair and at least one predictive code occurrence associated with a second predictive code, and also at least one temporally-proximate occurrence subset includes more than one predictive code occurrence associated with the first predictive code of the predictive code pair).

For example, in the operational example of FIG. 6, given the determination of temporally-proximate occurrence subsets 611-612, the predictive data analysis computing entity 106 may determine the following observed co-occurrences: (i) a first observed co-occurrence that describes that the predictive code 27132 and the predictive code 20680 occur within the first temporally-proximate occurrence subset 611, (ii) a second observed co-occurrence that describes that the predictive code 27134 and the predictive code 27138 occur within the second temporally-proximate occurrence subset 612, (iii) a third observed co-occurrence that describes that the predictive code 27138 and the predictive code 27137 occur within the second temporally-proximate occurrence subset 612, and (iv) a fourth observed co-occurrence that describes that the predictive code 27134 and the predictive code 27137 occur within the second temporally-proximate occurrence subset 612.

A pairwise temporal distance measure may describe a measure of magnitude of the difference between occurrence timestamp of a first predictive code occurrence that is associated with the pairwise temporal distance measure and the occurrence timestamp of a second predictive code occurrence that is associated with the pairwise temporal distance measure. For example, the pairwise temporal distance measure may describe a number of days between the occurrence date of a first predictive code occurrence that is associated with the pairwise temporal distance measure and the occurrence date of a second predictive code occurrence that is associated with the pairwise temporal distance measure. In some embodiments, the pairwise temporal distance measure describes a measure of magnitude of the difference between occurrence timestamp of a first predictive code occurrence that is associated with the pairwise temporal distance measure and the occurrence timestamp of a second predictive code occurrence that is associated with the pairwise temporal distance measure, where the first predictive code occurrence and the second predictive code occurrence are associated with a particular observed co-occurrence, and thus the pairwise temporal distance measure is deemed to be associated with the particular observed co-occurrence.

For example, in the operational example of FIG. 6: (i) given a first observed co-occurrence that describes that the predictive code 27132 and the predictive code 20680 occur within the first temporally-proximate occurrence subsets 611, the pairwise temporal distance measure for this first observed co-occurrence may be zero (as the occurrence timestamps for the training predictive code occurrence 601 that is associated with the predictive code 27132 and the training predictive code occurrence 601 that is associated with the predictive code 20680 is zero days); (ii) given a second observed co-occurrence that describes that the predictive code 27134 and the predictive code 27138 occur within the second temporally-proximate occurrence subsets 612, the pairwise temporal distance measure for this second observed co-occurrence may be zero (as the occurrence timestamps for the training predictive code occurrence 603 that is associated with the predictive code 27134 and the predictive code occurrence 604 that is associated with the predictive code 27138 is zero days); (iii) given a third observed co-occurrence that describes that the predictive code 27138 and the predictive code 27137 occur within the second temporally-proximate occurrence subsets 612, the pairwise temporal distance measure for this third observed co-occurrence may be zero (as the occurrence timestamps for the predictive code occurrence 604 that is associated with the predictive code 27138 and the predictive code occurrence 605 that is associated with the predictive code 27137 is zero days); and (iv) given a fourth observed co-occurrence that describes that the predictive code 27134 and the predictive code 27137 occur within the second temporally-proximate occurrence subsets 612, the pairwise temporal distance measure for this first observed co-occurrence may be zero (as the occurrence timestamps for the training predictive code occurrence 603 that is associated with the predictive code 27134 and the predictive code occurrence 605 that is associated with the predictive code 27137 is zero days).

Returning to FIG. 5, at step/operation 504, the predictive data analysis computing entity 106 updates the graph-based code recommendation machine learning model based at least in part on each pairwise temporal distance measure for an observed co-occurrence. In some embodiments, the predictive data analysis computing entity 106 updates each inferred edge weight value that is associated with a predictive code pair based at least in part on each temporal distance measure for an observed co-occurrence that is associated with the predictive code pair. This could mean that: (i) if a predictive code pair is associated with more than one observed co-occurrence, during a single training iteration the inferred edge weight value for the predictive code pair may be modified more than once (e.g., once corresponding to each observed co-occurrence), and (ii) if a predictive code pair is associated with zero observed co-occurrences, then the inferred edge weight value for the predictive code pair may not be modified at all during a particular training iteration.

In some embodiments, step/operation 504 includes processing each observed co-occurrence for a predictive code pair to update an inferred edge weight value that is associated with the noted predictive code pair. In some of the noted embodiments, updating an inferred edge weight value that is associated with a predictive code pair based at least in part on an observed co-occurrence for the predictive code pair is performed in accordance with the process that is depicted in FIG. 8. As described above, a person of ordinary skill in the relevant technology will recognize that the process depicted in FIG. 8 may occur more than once with respect to each inferred edge weight value if the predictive code pair for inferred edge weight value is associated with more than one observed co-occurrence, which is a scenario that may for example occur if more than one temporally-proximate occurrence subset includes at least one predictive code occurrence for a first predictive code of the predictive code pair and at least one predictive code occurrence for a second predictive code of the predictive code pair.

The process that is depicted in FIG. 8 begins at step/operation 801 when the predictive data analysis computing entity 106 performs a forward adjustment transformation on the pairwise temporal distance measure for the observed co-occurrence to generate a forward-adjusted temporal distance measure. A forward adjustment transformation may describe a set of computer-implemented operations that are configured to cause a temporal distance measure to increase by a predefined value. For example, a forward adjustment transformation may cause a pairwise temporal distance measure for an observed co-occurrence to increase by a predefined value, for example by a predefined value of two. In some embodiments, performing a forward adjustment transformation on each pairwise temporal distance measure for a related observed co-occurrence of the one or more related observed co-occurrences comprises increasing the pair-wise temporal distance measure by two. The output of performing a forward adjustment transformation on a pair-wise temporal distance measure for an observed co-occurrence is referred to herein as a forward-adjusted temporal distance measure.

At step/operation 802, the predictive data analysis computing entity 106 performs a compression transformation on the forward-adjusted temporal distance measure for an observed co-occurrence to generate a compressed forward-adjusted temporal distance measure for the observed co-occurrence. A compression transformation may describe a set of computer-implemented operations that are configured to cause a temporal distance measure to reduce the scale of the temporal distance measure. An example of a compression transformation is a transformation that includes a logarithmic transformation. In some embodiments, performing a compression transformation on a forward-adjusted pairwise temporal distance measure for an observed co-occurrence comprises: performing a logarithmic transformation on the forward-adjusted temporal distance measure to generate a logarithmically-transformed forward-adjusted temporal distance measure for the observed co-occurrence; and generating the compressed forward-adjusted temporal distance measure based at least in part on the logarithmically-transformed forward-adjusted temporal distance measure for the observed co-occurrence. In some of the noted embodiments, generating the compressed forward-adjusted temporal distance measure based at least in part on the logarithmically-transformed forward-adjusted temporal distance measure comprises generating the compressed forward-adjusted temporal distance measure based at least in part on an inverse of the logarithmically-transformed forward-adjusted temporal distance measure. The output of performing a compression transformation on a temporal distance measure is referred to herein as a compressed temporal distance measure, and the output of performing a compression transformation on a forward-adjusted temporal distance measure is referred to herein as a compressed forward-adjusted temporal distance measure. The output of performing a logarithmic transformation on a temporal distance measure is referred to herein as a logarithmically-transformed temporal distance measure, and the output of performing a logarithmic transformation on a forward-adjusted temporal distance measure is referred to herein as a logarithmically-transformed forward-adjusted temporal distance measure.

At step/operation 803, the predictive data analysis computing entity 106 updates a pre-update value of the inferred edge weight value based at least in part on the compressed forward-adjusted temporal distance measure for the observed co-occurrence. In some embodiments, during a first update of an inferred edge weight value, the pre-update value of the inferred edge weight value may be set to a default value such as zero. In some embodiments, updating the inferred edge weight value W(u,v) that is associated with a predictive code pair that includes a predictive code node u and a predictive code node v is determined using the equation $$W(u, v) = W'(u, v) + \frac{1}{\log(t + \varepsilon)},$$

where: (i) t is the pairwise temporal distance measure for an observed co-occurrence of the predictive code pair that is used to perform the update, (ii) £ is a forward adjustment hyper-parameter of the graph-based code recommendation machine learning model that describes the predefined value applied to t as part of the forward adjustment transformation of t, (iii) t+ε is the forward-adjusted temporal distance measure for the observed co-occurrence, (iv) W'(u,v) is the pre-update value of the inferred edge weight value W(u,v), and (v) log (t+ε) is the compressed forward-adjusted temporal distance measure for the observed co-occurrence.

In some embodiments, given a forward adjustment hyper-parameter of two, updating the inferred edge weight value W(u,v) that is associated with a predictive code pair that includes a predictive code node u and a predictive code node v is determined using the equation $$W(u, v) = W'(u, v) + \frac{1}{\log(t + 2)},$$

where: (i) t is the pairwise temporal distance measure for an observed co-occurrence of the predictive code pair that is used to perform the update, (ii) t+2 is the forward-adjusted temporal distance measure for the observed co-occurrence, (iii) W'(u,v) is the pre-update value of the inferred edge weight value W(u,v), and (iv) log (t+2) is the compressed forward-adjusted temporal distance measure for the observed co-occurrence.

In some embodiments, given a pre-update value of zero (e.g., during a first update of an inferred edge weight value), updating the inferred edge weight value W(u,v) that is associated with a predictive code pair that includes a predictive code node u and a predictive code node v is determined using the equation $$W(u, v) = \frac{1}{\log(t + \varepsilon)},$$

where: (i) t is the pairwise temporal distance measure for an observed co-occurrence of the predictive code pair that is used to perform the update, (ii) ε is a forward adjustment hyper-parameter of the graph-based code recommendation machine learning model that describes the predefined value applied to t as part of the forward adjustment transformation of t, (iii) t+ε is the forward-adjusted temporal distance measure for the observed co-occurrence, and (iv) log (t+ε) is the compressed forward-adjusted temporal distance measure for the observed co-occurrence.

In some embodiments, given a forward adjustment hyper-parameter of two and pre-update value of zero (e.g., during a first update of an inferred edge weight value), updating the inferred edge weight value W(u,v) that is associated with a predictive code pair that includes a predictive code node u and a predictive code node v is determined using the equation $$W(u, v) = \frac{1}{\log(t + 2)},$$

where: (i) t is the pairwise temporal distance measure for an observed co-occurrence of the predictive code pair that is used to perform the update, (ii) t+2 is the forward-adjusted temporal distance measure for the observed co-occurrence, and (iii) log (t+2) is the compressed forward-adjusted temporal distance measure for the observed co-occurrence.

An operational example of a graph-based code recommendation machine learning model 900 is depicted in FIG. 9. As depicted in FIG. 9, the graph-based code recommendation machine learning model 900 describes predictive code nodes 901-906 each corresponding to a predictive code, as well as inferred edge weight values 911-917. For example, as depicted in FIG. 9: (i) the inferred edge weight value 911 of 6.98% for the predictive code node 901 and the predictive code node 902 (describing predictive codes 27132 and 27134 respectively); (ii) the inferred edge weight value 912 of 16.86% for the predictive code node 901 and the predictive code node 903 (describing predictive codes 27132 and 27130 respectively); (iii) the inferred edge weight value 913 of 7.27% for the predictive code nodes 901 and the predictive code node 904 (describing predictive codes 27132 and 27175 respectively); (iv) the inferred edge weight value 914 of 40.12% for the predictive code node 901 and the predictive code node 905 (describing predictive codes 27132 and 26080 respectively); (v) the inferred edge weight value 915 of 6.4% for the predictive code node 901 and the predictive code node 906 (describing predictive codes 27132 and 11982 respectively); (vi) the inferred edge weight value 916 of 11.98% for the predictive code node 902 and the predictive code node 903 (describing predictive codes 27134 and 27130 respectively); and (vii) the inferred edge weight value 917 of 6.38% for the predictive code node 905 and the predictive code node 906 (describing predictive codes 20680 and 11982 respectively).

Returning to FIG. 4, at step/operation 402, the predictive data analysis computing entity 106 processes the input predictive code using the graph-based code recommendation machine learning model to generate one or more related codes for the predictive code. In some embodiments, the one or more related codes are selected based at least in part on each inferred edge weight value for the predictive code node in the graph-based code recommendation machine learning model that is associated with the input predictive code.

In some embodiments, step/operation 402 may be performed in accordance with the process that is depicted in FIG. 10. The process that is depicted in FIG. 10 begins at step/operation 1001 when the predictive data analysis computing entity 106 identifies a target predictive code node for the input predictive code. For example, given the input predictive code of 27132 in the graph-based code recommendation machine learning model 900 of FIG. 9, the predictive code node 901 that corresponds to the input predictive code of 27132 may be identified.

At step/operation 1002, the predictive data analysis computing entity 106 identifies each target inferred edge weight value for the target predictive code node. For example, in the operational example of FIG. 9, for the predictive code node 901 that corresponds to the input predictive code of 27132, the following inferred edge weight values may be identified: (i) the inferred edge weight value 911 of 6.98% for the predictive code node 901 and the predictive code node 902 (describing predictive codes 27132 and 27134 respectively);

(ii) the inferred edge weight value 912 of 16.86% for the predictive code node 901 and the predictive code node 903 (describing predictive codes 27132 and 27130 respectively); (iii) the inferred edge weight value 913 of 7.27% for the predictive code nodes 901 and the predictive code node 904 (describing predictive codes 27132 and 27175 respectively); (iv) the inferred edge weight value 914 of 40.12% for the predictive code node 901 and the predictive code node 905 (describing predictive codes 27132 and 26080 respectively); and (v) the inferred edge weight value 915 of 6.4% for the predictive code node 901 and the predictive code node 906 (describing predictive codes 27132 and 11982 respectively).

At step/operation 1003, the predictive data analysis computing entity 106 determines the related codes as a predefined number of predictive codes whose target inferred edge weight value with respect to the target predictive code node is among the top n target inferred edge weight values (where n is the predefined number of desired predictive codes). For example, given n=2, the following predictive codes may be determined as related codes for the input predictive code 27132: 20680 that is associated with the inferred edge weight value 914 of 40.12% and 27130 that is associated with the inferred edge weight value 912 of 16.86%.

Returning to FIG. 4, at step/operation 403, the predictive data analysis computing entity 106 performs one or more prediction-based actions based at least in part on the related codes. For example, the predictive data analysis computing entity 106 may cause presentation of a prediction output user interface that displays the related codes. As another example, the predictive data analysis computing entity 106 may cause presentation of a prediction output user interface that displays a ranked list of the related codes, where the related codes are ranked based at least in part on the inferred edge weight values for the related codes with respect to the input predictive code. An operational example of a prediction output user interface 1100 is depicted in FIG. 11. As depicted in FIG. 11, in response to detecting inputting of the input predictive code 27132, the prediction output user interface 1100 has displayed indications of recommendations the related predictive code 20680 and the related predictive code 27130 using the recommendation user interface segment 1101.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
receiving, by one or more processors, a request identifying an input predictive code of a plurality of predictive codes;
determining, by the one or more processors, using a graph-based machine learning model and based at least in part on the input predictive code, a related code for the input predictive code by:

(i) determining, using the graph-based machine learning model, a first predictive code node corresponding to the input predictive code, wherein the graph-based machine learning model comprises the first predictive code node associated with the input predictive code and a second predictive code node associated with the related code, and (ii) determining, using the graph-based machine learning model, the second predictive code node is related to the first predictive code node based at least in part on an inferred edge weight value associated with an edge between the second predictive code node and the first predictive code node, wherein:

(a) the first predictive code node is associated with a set of predictive code occurrences for the input predictive code and a set of occurrence timestamps respectively associated with the set of predictive code occurrences;

(b) the inferred edge weight value is based at least in part on a compressed forward-adjusted temporal distance measure between a first occurrence timestamp corresponding to a first predictive code occurrence of the input predictive code and a second occurrence timestamp corresponding to a second predictive code occurrence of the related code; and (c) the graph-based machine learning model is trained using a set of training predictive codes within a temporally-proximate occurrence subset, wherein (i) the temporally-proximate occurrence subset comprises a group of predictive code occurrences within a temporal range, (ii) the temporally-proximate occurrence subset comprises a predictive code pair, and (iii) the graph-based machine learning model is trained based at least in part on a pairwise temporal distance measure associated with the predictive code pair; and providing for display, by the one or more processors, the related code.

2. The computer-implemented method of claim 1, further comprising updating the inferred edge weight value by:

determining, based at least in part on the first occurrence timestamp, a first set of temporally-proximate occurrences comprising one or more predictive code occurrences of the set of predictive code occurrences;

determining, based at least in part on the second occurrence timestamp, a second set of temporally-proximate occurrences;

determining the input predictive code and the related code are associated with an observed co-occurrence, wherein the observed co-occurrence comprises at least one of the first predictive code occurrence or the second predictive code occurrence and is a member of the first set of temporally-proximate occurrences and the second set of temporally-proximate occurrences, and wherein:

the observed co-occurrence is associated with a pairwise temporal distance measure between the first occurrence timestamp of the first predictive code occurrence and the second occurrence timestamp of the second predictive code occurrence; and in response to determining that the input predictive code and the related code are associated with the observed co-occurrence:

performing a forward adjustment transformation on the pairwise temporal distance measure for the observed co-occurrence to generate a forward-adjusted temporal distance measure for the observed co-occurrence, performing a compression transformation on the forward-adjusted temporal distance measure for the observed co-occurrence to generate the compressed forward-adjusted temporal distance measure for the observed co-occurrence, and updating the inferred edge weight value based at least in part on the compressed forward-adjusted temporal distance measure.

3. The computer-implemented method of claim 2, wherein determining the first set of temporally-proximate occurrences comprises:

determining a temporal range for the set of predictive code occurrences based at least in part on the first occurrence timestamp;

determining, based at least in part on a temporal subdivision hyper-parameter of the graph-based machine learning model, a set of periods of the temporal range; and determining a first temporally-proximate occurrence of the first set of temporally-proximate occurrences based on determining that the first temporally-proximate occurrence is associated with a third occurrence timestamp that is within a first period of the set of periods.

4. The computer-implemented method of claim 2, wherein performing the forward adjustment transformation on the pairwise temporal distance measure for the observed co-occurrence comprises increasing the pairwise temporal distance measure by a predefined value.

5. The computer-implemented method of claim 2, wherein performing the compression transformation on the forward-adjusted temporal distance measure for the observed co-occurrence comprises:

performing a logarithmic transformation on the forward-adjusted temporal distance measure to generate a logarithmically-transformed forward-adjusted temporal distance measure; and generating the compressed forward-adjusted temporal distance measure based at least in part on the logarithmically-transformed forward-adjusted temporal distance measure.

6. The computer-implemented method of claim 5, wherein generating the compressed forward-adjusted temporal distance measure based at least in part on the logarithmically-transformed forward-adjusted temporal distance measure comprises generating the compressed forward-adjusted temporal distance measure based at least in part on an inverse of the logarithmically-transformed forward-adjusted temporal distance measure.

7. The computer-implemented method of claim 1, wherein the input predictive code corresponds to a procedure code.

8. A system comprising one or more processors and at least one memory storing processor executable instructions that, when executed by the one or more processors, cause the one or more processors to:

receive a request identifying an input predictive code of a plurality of predictive codes;

determine, using a graph-based machine learning model, and based at least in part on the input predictive code, a related code for the input predictive code by:

(i) determining, using the graph-based machine learning model comprises a first predictive code node corresponding to the input predictive code, wherein the graph-based machine learning model comprises the first predictive code node associated with the input predictive code and a second predictive code node associated with the related code, and (ii) determining, using the graph-based machine learning model, the second predictive code node is related to the first predictive code node based at least in part on an inferred edge weight value associated with an edge between the second predictive code node and the first predictive code node, wherein:

(a) the first predictive code node a set of predictive code occurrences for the input predictive code and a set of occurrence timestamps respectively associated with the set of predictive code occurrences;

(b) the inferred edge weight value is based at least in part on a compressed forward-adjusted temporal distance measure between a first occurrence timestamp corresponding to a first predictive code occurrence of the input predictive code and a second occurrence timestamp corresponding to a second predictive code occurrence of the related code; and (c) the graph-based machine learning model is trained using a set of training predictive codes within a temporally-proximate occurrence subset, wherein (i) the temporally-proximate occurrence subset comprises a group of predictive code occurrences within a temporal range, (ii) the temporally-proximate occurrence subset comprises a predictive code pair, and (iii) the graph-based machine learning model is trained based at least in part on a pairwise temporal distance measure associated with the predictive code pair; and provide for display the related code.

9. The system of claim 8, wherein the processor executable instructions further cause the one or more processors to update the inferred edge weight value by:

determining, based at least in part on the first occurrence timestamp, a first set of temporally-proximate occurrences comprising one or more predictive code occurrences of the set of predictive code occurrences;

determining, based at least in part on the second occurrence timestamp, a second set of temporally-proximate occurrences;

determining the input predictive code and the related code are associated with an observed co-occurrence, wherein the observed co-occurrence comprises at least one of the first predictive code occurrence or the second predictive code occurrence and is a member of the first set of temporally-proximate occurrences and the second set of temporally-proximate occurrences, and wherein:

the observed co-occurrence is associated with a pairwise temporal distance measure between the first occurrence timestamp of the first predictive code occurrence and the second occurrence timestamp of the second predictive code occurrence; and in response to determining that the input predictive code and the related code are associated with the observed co-occurrence:

performing a forward adjustment transformation on the pairwise temporal distance measure for the observed co-occurrence to generate a forward-adjusted temporal distance measure for the observed co-occurrence, performing a compression transformation on the forward-adjusted temporal distance measure to generate the compressed forward-adjusted temporal distance measure, and updating the inferred edge weight value based at least in part on the compressed forward-adjusted temporal distance measure.

10. The system of claim 9, wherein to determine the first set of temporally-proximate occurrences the processor executable instructions further cause the one or more processors to:

determine a temporal range for the set of predictive code occurrences based at least in part on the first occurrence timestamp;

determine, based at least in part on a temporal subdivision hyper-parameter of the graph-based machine learning model, a set of periods of the temporal range; and determining a first temporally-proximate occurrence of the first set of temporally-proximate occurrences based on determining that the first temporally-proximate occurrence is associated with a third occurrence timestamp that is within a first period of the set of periods.

11. The system of claim 9, wherein to perform the forward adjustment transformation on the pairwise temporal distance measure for the observed co-occurrence the processor executable instructions further cause the one or more processors to:

increase the pairwise temporal distance measure by a predefined value.

12. The system of claim 9, wherein to perform the compression transformation on the forward-adjusted temporal distance measure for the observed co-occurrence the processor executable instructions further cause the one or more processors to:

perform a logarithmic transformation on the forward-adjusted temporal distance measure to generate a logarithmically-transformed forward-adjusted temporal distance measure; and generate the compressed forward-adjusted temporal distance measure based at least in part on the logarithmically-transformed forward-adjusted temporal distance measure.

13. The system of claim 12, wherein to generate the compressed forward-adjusted temporal distance measure based at least in part on the logarithmically-transformed forward-adjusted temporal distance measure the processor executable instructions further cause the one or more processors to:

generate the compressed forward-adjusted temporal distance measure based at least in part on an inverse of the logarithmically-transformed forward-adjusted temporal distance measure.

14. The system of claim 8, wherein the input predictive code corresponds to a procedure codes.

15. One or more non-transitory computer-readable storage media including instructions that, when executed by one or more processors, cause the one or more processors to:

receive a request identifying an input predictive code of a plurality of predictive codes;

determine, using a graph-based machine learning model, and based at least in part on the input predictive code, a related code for the input predictive code by (i) determining, using the graph-based machine learning model, a first predictive code node corresponding to the input predictive code, wherein the graph-based machine learning model comprises the first predictive code node associated with the input predictive code and a second predictive code node associated with the related code, and (ii) determining, using the graph-based machine learning model, the second predictive code node is related to the first predictive code node based at least in part on an inferred edge weight value associated with an edge between the second predictive code node and the first predictive code node, wherein:

(a) the first predictive code node is associated with a set of predictive code occurrences for the input predictive code and a set of occurrence timestamps respectively associated with the set of predictive code occurrences;

(b) the inferred edge weight value is based at least in part on a compressed forward-adjusted temporal distance measure between a first occurrence timestamp associated with a first predictive code occurrence of the input predictive code and a second occurrence timestamp associated with a second predictive code occurrence of the related code; and (c) the graph-based machine learning model is trained using a set of training predictive codes within a temporally-proximate occurrence subset, wherein (i) the temporally-proximate occurrence subset comprises a group of predictive code occurrences within a defined temporal range, (ii) temporally-proximate occurrence subset comprises a predictive code pair, and (iii) the graph-based machine learning model is trained based at least in part on a pairwise temporal distance measure associated with the predictive code pair; and provide for display the related code.

16. The one or more non-transitory computer-readable storage media of claim 15, wherein the instructions further cause the one or more processors to update the inferred edge weight value by:

determining, based at least in part on the first occurrence timestamp, a first set of temporally-proximate occurrences comprising one or more temporally-proximate predictive code occurrences of the set of predictive code occurrences;

determining, based at least in part on the second occurrence timestamp, a second set of temporally-proximate occurrences;

determining the input predictive code and the related code are associated with an observed co-occurrence, wherein the observed co-occurrence comprises at least one of the first predictive code occurrence or the second predictive code occurrence and is a member of the first set of temporally-proximate occurrences and the second set of temporally-proximate occurrences, and wherein:

the observed co-occurrence is associated with a pairwise temporal distance measure between the first occurrence timestamp of the first predictive code occurrence and the second occurrence timestamp of the second predictive code occurrence; and in response to determining that the input predictive code and the related code are associated with the observed co-occurrence:

performing a forward adjustment transformation on the pairwise temporal distance measure for the observed co-occurrence to generate a forward-adjusted temporal distance measure for the observed co-occurrence, performing a compression transformation on the forward-adjusted temporal distance measure to generate the compressed forward-adjusted temporal distance measure, and updating the inferred edge weight value based at least in part on the compressed forward-adjusted temporal distance measure.

17. The one or more non-transitory computer-readable storage media of claim 16, wherein to determine the first set of temporally-proximate occurrences the instructions further cause the one or more processors to:

determine a temporal range for the set of predictive code occurrences based at least in part on the first occurrence timestamp;

determine, based at least in part on a temporal subdivision hyper-parameter of the graph-based machine learning model, a set of periods of the temporal range; and determining a first temporally-proximate occurrence of the first set of temporally-proximate occurrences based on determining that the first temporally-proximate occurrence is associated with a third occurrence timestamp that is within a first period of the set of periods.

18. The one or more non-transitory computer-readable storage media of claim 16, wherein to perform the forward adjustment transformation on the pairwise temporal distance measure for the observed co-occurrence the instructions further cause the one or more processors to:

increase the pairwise temporal distance measure by a predefined value.

19. The one or more non-transitory computer-readable storage media of claim 16, wherein to perform the compression transformation on the forward-adjusted temporal distance measure for the observed co-occurrence the instructions further cause the one or more processors to:

perform a logarithmic transformation on the forward-adjusted temporal distance measure to generate a logarithmically-transformed forward-adjusted temporal distance measure; and generate the compressed forward-adjusted temporal distance measure based at least in part on the logarithmically-transformed forward-adjusted temporal distance measure.

20. The one or more non-transitory computer-readable storage media of claim 19, wherein to generate the compressed forward-adjusted temporal distance measure based at least in part on the logarithmically-transformed forward-adjusted temporal distance measure the instructions further cause the one or more processors to:

generate the compressed forward-adjusted temporal distance measure based at least in part on an inverse of the logarithmically-transformed forward-adjusted temporal distance measure.

* * * * *